United States Patent [19]

Egashira et al.

[11] Patent Number: 5,714,546
[45] Date of Patent: Feb. 3, 1998

[54] GOLF BALL COVER COMPOSITION

[75] Inventors: Yoshinori Egashira, Hidaka; Hisashi Yamagishi, Yokohama; Hideo Watanabe, Yokohama; Yasushi Ichikawa, Yokohama, all of Japan

[73] Assignee: Bridgestone Sports Co., Ltd., Tokyo, Japan

[21] Appl. No.: 381,391

[22] Filed: Jan. 31, 1995

[30] Foreign Application Priority Data

Feb. 10, 1994 [JP] Japan ........................... 6-037958

[51] Int. Cl.$^6$ .................... C08L 33/02; C08L 23/08; A63B 37/12
[52] U.S. Cl. .................... 525/196; 525/201; 525/221; 473/372; 473/377; 473/378; 473/385
[58] Field of Search .................... 525/196, 221, 525/201; 273/235 R; 473/372, 377, 378, 385

[56] References Cited

U.S. PATENT DOCUMENTS

| 4,801,649 | 1/1989 | Statz ........................... 525/221 |
| 4,884,814 | 12/1989 | Sullivan . | |
| 5,120,791 | 6/1992 | Sullivan ........................... 525/221 |
| 5,397,840 | 3/1995 | Sullivan et al. ........................... 525/221 |

FOREIGN PATENT DOCUMENTS

| 1-308577 | 12/1989 | Japan . |
| 5-277208 | 10/1993 | Japan . |
| 2214515 | 9/1989 | United Kingdom . |
| 2247682 | 3/1992 | United Kingdom . |
| 2264302 | 8/1993 | United Kingdom . |
| 2276628 | 10/1994 | United Kingdom . |

OTHER PUBLICATIONS

Research Disclosure No. 27103—Ionomer Blends for Golf Ball Covers—DuPont—Nov. 1986.

Surlyn Product Guide—Du pont Oct. 1993.

*Primary Examiner*—David Buttner
*Attorney, Agent, or Firm*—Sughrue, Mion, Zinn, Macpeak & Seas, PLLC

[57] ABSTRACT

A golf ball cover is formed of a composition comprising (a) 70–95% by weight of a sodium or zinc salt of an ethylene-unsaturated carboxylic acid-unsaturated carboxylate terpolymer or a mixture thereof and (b) 30–5% by weight of a sodium or zinc salt of an ethylene-unsaturated carboxylic acid copolymer, an ethylene-unsaturated carboxylic acid-unsaturated carboxylate terpolymer or a mixture thereof, having an M.F.R. of at least 4, the composition curing into a product having a hardness of 55–80 on JIS C scale and a tensile stress at 10% distortion of 40–140 kg/cm$^2$. The composition is easy to mold and allows for manufacture of a golf ball having improved spin properties and resistant to impact by iron and other clubs.

8 Claims, No Drawings

GOLF BALL COVER COMPOSITION

BACKGROUND OF THE INVENTION

1. Field of the Invention

This invention relates to a golf ball cover composition.

2. Prior Art

As the cover material of two-piece golf balls and some wound golf balls, ionomer resins in the form of ethylene-(meth)acrylic acid copolymer are widely used and accepted because of their long-lasting impact resistance and cut resistance. Since the ionomer resins provide hard hitting feel and high hardness as compared with the balata rubber conventionally used as the cover material, golf balls with an ionomer resin cover are said difficult to impart a desired quantity of spin and inferior to control on iron shots.

For improvements in these respects, U.S. Pat. No. 4,884,814 or JP-A 308677/1989 proposes to blend an ionomer resin in the form of an ethylene-(meth)acrylic acid copolymer having a certain spectrum of physical properties with a specific amount of an ethylene-(meth)acrylic acid-(meth)acrylate terpolymer ionomer which is a relatively soft ionomer resin. The soft/hard ionomer blend is used as a golf ball cover. This is a quite effective technique for improving the hitting feel and control of golf balls using a conventional ionomer resin in the form of an ethylene-(meth)acrylic acid copolymer as the cover.

Nevertheless, the golf ball cover of the above-mentioned soft/hard ionomer blend has several problems. The cover is softer and allows the ball to receive more spin on iron shots, which means the increased frictional force between the club face and the cover. Then balls using a hard core such as two-piece solid golf balls have the likelihood that the ball surface be peeled as a consequence of iron shots because the cover surface can be peeled by grooves across the iron club face.

An improvement in this regard is proposed in JP-A 277208/1993. A mixture of two or more metal salts of an ethylene-unsaturated carboxylic acid-unsaturated carboxylate terpolymer having a low flexural modulus is used as the cover for the purpose of protecting the ionomer cover against fretting by iron club shots. This technique has many problems in manufacturing or molding because of poor flow of the material used therein and the resulting balls are inferior in performance. For example, when a conventional cover enclosing process (involving interposition of a core between half cups of the cover material followed by heat pressure molding or injection molding of the cover material around a core) is used, the low flowing material has the problems that as compared with smooth flowing resins, dimples on the inner surface of a mold are poorly transferred thereto, that the mold configuration is not faithfully reflected to exacerbate ball sphericity, and that weld lines appear to reduce impact durability.

SUMMARY OF THE INVENTION

Therefore, an object of the present invention is to provide good feel, ease of spin or control, and resistance to peeling.

Making efforts to develop a golf ball cover composition which is flexible and readily moldable and which offers a soft feel, good spin property, and improved resistance to peeling by iron shots when used as the golf ball cover, we have found that when a composition is comprised of (a) 70 to 95% by weight of a sodium or zinc salt of an ethylene-unsaturated carboxylic acid-unsaturated carboxylate terpolymer or a mixture thereof and (b) 30 to 5% by weight of a sodium or zinc salt of an ethylene-unsaturated carboxylic acid copolymer, an ethylene-unsaturated carboxylic acid-unsaturated carboxylate terpolymer or a mixture thereof, having a melt flow rate (M.F.R., defined below) of at least 4, the composition curing into a product having a hardness of 55 to 80 on JIS C scale and a tensile stress at 10% distortion of 40 to 140 kg/cm$^2$, there is obtained a golf ball cover which has overcome the above-mentioned problems, offers improved flexibility, soft hitting feel, susceptibility to spin, and ease of control, and is resistant to scuff and damages by iron clubs.

According to the present invention, there is provided a composition for forming a golf ball cover, comprising (a) 70 to 95% by weight of a sodium or zinc salt of an ethylene-unsaturated carboxylic acid-unsaturated carboxylate terpolymer or a mixture thereof and (b) 30 to 5% by weight of a sodium or zinc salt of an ethylene-unsaturated carboxylic acid copolymer, an ethylene-unsaturated carboxylic acid-unsaturated carboxylate terpolymer or a mixture thereof, having an M.F.R. of at least 4, the composition curing into a product having a hardness of 55 to 80 on JIS C hardness scale and a tensile stress at 10% distortion of 40 to 140 kg/cm$^2$.

DETAILED DESCRIPTION OF THE INVENTION

According to the present invention, the cover of the golf ball is formed of a composition comprising (a) a sodium or zinc salt of an ethylene-unsaturated carboxylic acid-unsaturated carboxylate terpolymer or a mixture thereof and (b) a sodium or zinc salt of an ethylene-unsaturated carboxylic acid copolymer, an ethylene-unsaturated carboxylic acid-unsaturated carboxylate terpolymer or a mixture thereof.

Component (a)

It is a sodium or zinc salt of an ethylene-unsaturated carboxylic acid-unsaturated carboxylate terpolymer. The unsaturated carboxylic acid is preferably selected from aliphatic monocarboxylic acids having 3 to 8 carbon atoms, especially acrylic acid and methacrylic acid. The unsaturated carboxylate is preferably selected from esters of unsaturated carboxylic acids having 3 to 8 carbon atoms (e.g., acrylic and methacrylic acid) with alcohols having 1 to 9 carbon atoms, the esters having 4 to 12 carbon atoms in total. Exemplary esters include methyl acrylate, ethyl acrylate, isobutyl acrylate, n-butyl acrylate, 2-ethylhexyl acrylate, methyl methacrylate, and isobutyl methacrylate.

Examples of the sodium and zinc salts of terpolymer are shown in Table 1.

TABLE 1

| Trade name | Manufacturer | Neutralizing metal | Flexural modulus (psi) | M.F.R. (g/10 min.) |
|---|---|---|---|---|
| Himilan 1855 | Mitsui — DuPont Polychemical K.K. | Zn | 13,000 | 1.0 |
| Himilan 1856 | Mitsui — DuPont Polychemical K.K. | Na | 10,100 | 1.0 |
| Surlyn 9020 | E. I. DuPont de Nemours Co. | Zn | 14,400 | 1.1 |

TABLE 1-continued

| Trade name | Manufacturer | Neutralizing metal | Flexural modulus (psi) | M.F.R. (g/10 min.) |
|---|---|---|---|---|
| Surlyn 8020 | E. I. DuPont de Nemours Co. | Na | 14,400 | 1.0 |
| Surlyn 8120 | E. I. DuPont de Nemours Co. | Na | 7,100 | 0.9 |
| Surlyn 8320 | E. I. DuPont de Nemours Co. | Na | 2,800 | 0.9 |
| Iotak 7510 | Exxon Chemical Corp. | Zn | 5,200 | 0.8 |
| Iotak 7520 | Exxon Chemical Corp. | Zn | 3,800 | 2.0 |

The sodium and zinc salts of terpolymers may be used alone or in admixture of two or more. A blend of sodium and zinc salts is preferred from the standpoints of repulsion and durability. In such a blend, the sodium and zinc salts are desirably mixed in a weight ratio of from 20:80 to 80:20, especially from 40:60 to 70:30.

It is seen from Table 1 that these sodium and zinc salts of terpolymers are relatively soft among ionomer resins since they have a flexural modulus of about 2,500 to 15,000 psi, indicating that they are suitable as soft feeling covers. However, their M.F.R. which is an index of flow is not more than 2.0, mostly not more than 1.0, indicating that they are low flowing and difficult to mold.

It is to be noted that the melt flow rate (M.F.R.) as used herein is measured according to JIS K-7210 (1976) Method A.

Component (b)

Therefore, it is necessary to improve the flow of the sodium or zinc salt of terpolymer or mixture thereof. According to the present invention, to the sodium or zinc salt of terpolymer or mixture thereof is added component (b) which is smooth flowing and compatible with the metal salt of terpolymer. Component (b) is a sodium or zinc salt of an ethylene-unsaturated carboxylic acid copolymer, an ethylene-unsaturated carboxylic acid-unsaturated carboxylate terpolymer or a mixture Component (b) should preferably have an M.F.R. of up to 30 because above this limit, the resulting balls would be deteriorated in durability (scuff resistance) and performance (repulsion).

In the sodium and zinc salts of ethylene-unsaturated carboxylic acid copolymer, the unsaturated carboxylic acid is preferably selected from aliphatic monocarboxylic acids having 3 to 8 carbon atoms, especially acrylic acid and methacrylic acid. These salts should have an M.F.R. of at least 4. Salts with an M.F.R. of less than 4 are less effective for improving moldability. Illustrative examples of the sodium and zinc salts of ethylene-unsaturated carboxylic acid copolymer are shown below.

TABLE 1

| Trade name | Manufacturer | Flexural modulus (psi) | M.F.R. (g/10 min.) |
|---|---|---|---|
| Himilan 1577 | Mitsui — DuPont Polychemical K.K. | 36,000 | 5.0 |
| Himilan 1652 | Mitsui — DuPont Polychemical K.K. | 24,000 | 5.0 |
| Himilan 1705 | Mitsui — DuPont Polychemical K.K. | 34,000 | 5.0 |
| Himilan 1702 | Mitsui — DuPont Polychemical K.K. | 22,000 | 14.0 |
| Surlyn 9650 | E. I. DuPont de Nemours Co. | 32,000 | 5.0 |
| Surlyn 9450 | E. I. DuPont de Nemours Co. | 19,000 | 5.5 |
| Surlyn 9950 | E. I. DuPont de Nemours Co. | 37,000 | 5.5 |
| Surlyn 9970 | E. I. DuPont de Nemours Co. | 28,000 | 14.0 |

Another useful component (b) is an ethylene-unsaturated carboxylic acid-unsaturated carboxylate terpolymer. The unsaturated carboxylic acid and unsaturated carboxylate moieties are the same as in the sodium or zinc salt of an ethylene-unsaturated carboxylic acid-unsaturated carboxylate terpolymer used as main component (a) although the terpolymer as component (b) should have an M.F.R. of at least 4. Exemplary terpolymers are shown below.

TABLE 3

| Trade name | Manufacturer | Flexural modulus (psi) | M.F.R. (g/10 min.) |
|---|---|---|---|
| Nucrel AN 4307 | Mitsui — DuPont Polychemical K.K. | 3,100 | 15 |
| Nucrel AN 4212C | Mitsui — DuPont Polychemical K.K. | 4,100 | 12 |
| Nucrel N 0825J | Mitsui — DuPont Polychemical K.K. | 2,900 | 25 |

Also included are mixtures of sodium and zinc salts of ethylene-unsaturated carboxylic acid copolymer, mixtures of ethylene-unsaturated carboxylic acid-unsaturated carboxylate terpolymers, and mixtures of a sodium or zinc salt of ethylene-unsaturated carboxylic acid copolymer with an ethylene-unsaturated carboxylic acid-unsaturated carboxylate terpolymer.

According to the present invention, components (a) and (b) are blended. The (total) amount of component (a) blended is 70 to 95% by weight of the resin components combined while the (total) amount of component (b) blended is 5 to 30% by weight of the resin components combined. If the amount of component (b) exceeds 30% by weight, peeling resistance becomes low. If the amount of component (b) is less than 5%, the effect of improving moldability is not fully achieved. The preferred amount of component (b) blended is 10 to 20% by weight of the resin components combined.

In the cover composition of the invention, dyes, pigments (e.g., titanium dioxide, zinc oxide and barium sulfate), UV absorbers, anti-oxidants, and dispersing aids (e.g., metal soaps) may be added to the resin component consisting of components (a) and (b), if desired. These components are mixed in a conventional mixing means, for example, a closed kneading machine (Banbury mixer and kneader) and extruder.

The cover composition of the invention is molded and cured into a golf ball cover by any conventional technique. The cover as cured should have a hardness of 55 to 80, preferably 65 to 75 on JIS C hardness scale and a tensile stress at 10% distortion of 40 to 140 kg/cm², preferably 70 to 110 kg/cm². If the cover's 5 hardness is more than 80, hitting feel and spin property become poor. If the hardness is less than 55, the cover is too soft to provide the ball with sufficient repulsion so that the ball does not fly well. If the cover's tensile stress at 10% distortion is less than 40 kg/cm², the cover is less repulsive and susceptible to damages by club hitting. If the tensile stress at 10% distortion is more than 120 kg/cm², the cover is likely to be peeled by iron shots.

It is to be noted that the tensile stress at 10% distortion is defined in JIS K-7113 as the tensile stress at which a specimen having a length of 100 is longitudinally stretched at a pulling rate of 500 mm/min. to a length of 110, the tensile stress being divided by the transverse cross-sectional area of the specimen before the tensile test.

The cover composition of the invention may be used as covers for solid golf balls such as two and three-piece golf balls and thread-wound golf balls. The cover composition exerts its function to the maximum when used as solid golf ball covers.

EXAMPLE

Examples of the present invention are given below by way of illustration and not by way of limitation.

Examples 1–5 & Comparative Examples 1–4

For the manufacture of large size two-piece golf balls, a core having a diameter of 38.5 mm was prepared by furnishing a rubber composition of the following formulation and effecting vulcanization at 155° C. for 18 minutes.

| Rubber composition (Core) | Parts by weight |
|---|---|
| Polybutadiene rubber | 100 |
| Barium sulfate | 14.0 |
| Zinc oxide | 5.0 |
| Anti-oxidant | 0.2 |
| Zinc acrylate | 36.0 |
| Peptizer | 0.5 |
| Dicumyl peroxide | 1.0 |

Next, a cover composition was prepared by adding additives to the resin composition shown in Table 4 so as to give the following formulation. The cover composition was injection molded over the core to form a cover of 2.0 mm thick thereon.

| | Parts by weight |
|---|---|
| Resin composition | 100 |
| Titanium oxide | 5 |
| Magnesium stearate | 1 |
| Bluing agent | 0.03 |

The resulting two-piece golf balls having a diameter of 42.7 mm and a weight of 45.2 grams were examined by the following tests.

(1) Dimple edge

When the cover composition was injection molded, it was examined how a dimple pattern on the mold was transferred to the molded ball. The edge definition of dimples was visually observed.

(2) Sphericity

The outer diameter (mm) of a ball was measured at 15 points. Reported is a variation range R (mm) of the measured diameter. Higher values indicate less spherical balls.

(3) Hardness

Hardness is expressed by a distortion (mm) of a ball under a load of 100 kg. Higher values indicate softer balls.

(4) Initial speed

An initial speed (m/s) was measured by an initial speed meter of the same type as prescribed by USGA.

(5) Spin

With a #7 iron mounted on a swing robot, a ball was hit at a head speed of 36 m/s. The motion of the ball immediately after impact was analyzed using high-speed photographs, determining a back spin quantity (rpm).

(6) Scuff test

A ball was kept at a temperature of 23° C. Three commercial pitching wedges were mounted on a robot machine. The ball was hit at three positions by the three pitching wedges, once at each position, at a head speed of 37 m/s. The three hit areas were visually observed. Evaluation was made according to the following criterion. The result is an average of four balls tested.

| Point | Remarks |
|---|---|
| 10: | no change on the ball surface |
| 9: | intermediate points 10 and 8 |
| 8: | very slight, substantially unperceivable club face dent |
| 7: | intermediate points 8 and 6 |
| 6: | substantial club face dent, but no peeling from the cover surface |
| 5: | intermediate points 6 and 4 |
| 4: | perceivably peeled surface |
| 3: | intermediate points 4 and 2 |
| 2: | peeled surface with some cracks |
| 1: | outstanding cracks |

The results are shown in Table 4.

TABLE 4

|  | Example | | | | | Comparative Example | | | |
|---|---|---|---|---|---|---|---|---|---|
|  | 1 | 2 | 3 | 4 | 5 | 1 | 2 | 3 | 4 |
| Resin composition (pbw) | | | | | | | | | |
| H1706 |  |  |  |  |  |  |  |  | 20 |
| H1557 | 20 |  |  |  |  |  |  | 35 |  |
| H1855 | 30 | 40 | 70 |  | 50 | 50 | 10 | 15 | 30 |
| H1856 |  |  |  | 90 | 25 |  |  |  |  |
| S8120 | 50 | 50 | 20 |  |  | 50 | 50 | 50 | 50 |
| N0825J |  | 10 | 10 | 10 | 25 |  | 40 |  |  |
| Cover physical property | | | | | | | | | |
| N.F.R. | 1.7 | 1.6 | 1.6 | 1.6 | 2.5 | 0.9 | 5.3 | 2.4 | 1.0 |
| JIS C hardness | 74 | 72 | 71 | 74 | 66 | 68 | 60 | 79 | 79 |
| 10% Tensile stress | 100 | 80 | 77 | 81 | 65 | 62 | 52 | 120 | 124 |
| Golf ball configuration | | | | | | | | | |
| Dimple edge | sharp | sharp | sharp | sharp | sharp | blunt | sharp | sharp | somewhat blunt |
| Sphericity | 0.12 | 0.13 | 0.13 | 0.12 | 0.10 | 0.31 | 0.13 | 0.12 | 0.22 |
| Golf ball performance | | | | | | | | | |
| Hardness | 2.66 | 2.75 | 2.72 | 2.77 | 2.87 | 2.85 | 2.95 | 2.58 | 2.58 |
| Initial speed | 76.9 | 76.7 | 76.6 | 76.4 | 76.3 | 76.5 | 75.9 | 77.0 | 77.0 |
| Spin | 8300 | 8600 | 8500 | 8200 | 8800 | 8600 | 9100 | 7700 | 7600 |
| Scuff | 8 | 8 | 8 | 7 | 6 | 8 | 4 | 5 | 4 |

The cover composition of the invention is easily moldable and offers golf balls having improved spin properties and resistant to impact by iron and other clubs.

Japanese Patent Application No. 6-37958 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A composition for forming a golf ball cover, comprising
   (a) 80 to 95% by weight of a sodium or zinc salt of an ethylene-unsaturated carboxylic acid-unsaturated carboxylate terpolymer or a mixture thereof, having a melt flow rate of less than 2 and
   (b) 20 to 5% by weight of an ethylene-unsaturated carboxylic acid-unsaturated carboxylate terpolymer having a melt flow rate of at least 4,
   said composition curing into a product having a hardness of 55 to 80 on JIS C hardness scale and a tensile stress at 10% distortion of 40 to 140 kg/cm$^2$.

2. The composition of claim 1 wherein the unsaturated carboxylic acid of components (a) and (b) has 3 to 8 carbon atoms and the unsaturated carboxylate is an ester of an unsaturated carboxylic acid having 3 to 8 carbon atoms with an alcohol having 1 to 9 carbon atoms.

3. A golf ball having a cover formed of the composition of claim 1 or 2.

4. The composition of claim 1, wherein the melt flow rate of component (a) is not more than 1.0.

5. The composition of claim 1, wherein component (b) is present in an amount of 20 to 10% by weight.

6. The composition of claim 1, wherein the composition cures into a product having a hardness of 65 to 75 on the JIS C hardness scale and a tensile stress at 10% distortion of 70 to 110 kg/cm$^2$.

7. The composition of claim 1, wherein the sodium salt and zinc salt of component (a) are mixed in a weight ratio of from 20:80 to 80:20.

8. The composition of claim 7, wherein the sodium salt and zinc salt of component (a) are mixed in a weight ratio of from 40:60 to 70:30.

* * * * *